(12) United States Patent
Tejedor et al.

(10) Patent No.: US 10,486,573 B2
(45) Date of Patent: Nov. 26, 2019

(54) ELASTIC SYSTEM FOR IMMOBILIZING A SEAT TRAY OF A VEHICLE, IN PARTICULAR OF AN AIRCRAFT

(71) Applicant: EXPLISEAT, Paris (FR)

(72) Inventors: Vincent Tejedor, Issy les Moulineaux (FR); Benjamin Jacob Saada, Paris (FR); Gilles Duval, Levallois Perret (FR); Stéphane Goset, Montmorency (FR); Jean-Charles Samuelian, Paris (FR)

(73) Assignee: EXPLISEAT, Paris (FR)

( * ) Notice: Subject to any disclaimer, the term of this patent is extended or adjusted under 35 U.S.C. 154(b) by 130 days.

(21) Appl. No.: 15/320,102

(22) PCT Filed: Jun. 25, 2015

(86) PCT No.: PCT/EP2015/064396
§ 371 (c)(1),
(2) Date: Dec. 19, 2016

(87) PCT Pub. No.: WO2015/197768
PCT Pub. Date: Dec. 30, 2015

(65) Prior Publication Data
US 2017/0136929 A1    May 18, 2017

(30) Foreign Application Priority Data
Jun. 27, 2014    (FR) ..................... 14 56046

(51) Int. Cl.
*B60N 3/00* (2006.01)
*B64D 11/06* (2006.01)

(52) U.S. Cl.
CPC .......... *B60N 3/004* (2013.01); *B64D 11/0638* (2014.12); *Y02T 50/46* (2013.01)

(58) Field of Classification Search
CPC ...... B60N 3/004; B64D 11/0638; Y02T 50/46
(Continued)

(56) References Cited

U.S. PATENT DOCUMENTS 125,521 A * 4/1872 Beidler .............. B64D 11/0638
297/146
2,098,426 A * 11/1937 McDonald ............. B60N 3/004
108/38

(Continued)

FOREIGN PATENT DOCUMENTS

EP    1 366 951 A2    12/2003
FR    2707570 A1 *    1/1995 ............. B60N 3/004
(Continued)

OTHER PUBLICATIONS

French Search Report issued in Patent Application No. FR 1456046 dated Feb. 20, 2015.
(Continued)

*Primary Examiner* — Milton Nelson, Jr.
(74) *Attorney, Agent, or Firm* — Pearne & Gordon LLP

(57) ABSTRACT

The elastic immobilizing device allows a passenger on a seat, positioned behind the seat carrying the tray and the device according to the invention, to use the tray (3) in an easy and practical manner and to avoid accidental breakage of the strap (17) which holds the tray (3), if the strap (17) is pulled accidentally or excessively. The strap (4) holding the tray (3) comprises a part that has low resistance to stretching (17) along the entire length thereof and comprises, along at least a part of the length thereof, a part that is highly resistant to stretching (18), mounted in series or in parallel with the part that has low resistance to stretching (17), the part that is highly resistant to stretching (18) being able to come into action when the part that has low resistance to stretching (17) has been stretched. Application to the seats of aircraft.

16 Claims, 5 Drawing Sheets

Figure 1A:
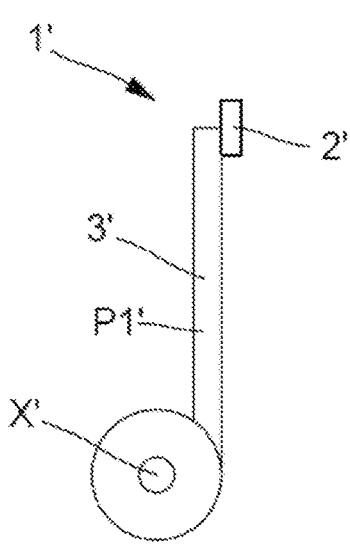

(58) Field of Classification Search
USPC .......... 297/188.05, 173, 146, 188.06, 217.3, 297/217.6, DIG. 6; 24/301
See application file for complete search history.

(56) References Cited

U.S. PATENT DOCUMENTS

| | | | | |
|---|---|---|---|---|
| 2,585,742 | A * | 2/1952 | Condon | B60N 3/004 108/134 |
| 2,948,182 | A * | 8/1960 | Huppertsberg | D04D 9/00 87/2 |
| 4,466,659 | A * | 8/1984 | Carpentier | A47C 7/70 108/149 |
| 5,611,597 | A * | 3/1997 | Lanz | B62B 3/144 297/217.1 |
| 6,971,716 | B2 * | 12/2005 | DePaulis | B60N 2/60 297/188.01 |
| 7,634,842 | B2 * | 12/2009 | Santisi | B62J 7/08 24/131 R |
| 2002/0195845 | A1 * | 12/2002 | Southwick | A47C 7/62 297/188.06 |
| 2009/0200840 | A1 | 8/2009 | Okumura et al. | |
| 2014/0209594 | A1 * | 7/2014 | Besner | A61N 5/06 219/217 |
| 2014/0252822 | A1 | 9/2014 | Tejedor | |
| 2015/0123433 | A1 * | 5/2015 | Lamb, Jr. | B60R 11/0229 297/188.05 |
| 2015/0367943 | A1 | 12/2015 | Saada et al. | |
| 2016/0046224 | A1 | 2/2016 | Saada et al. | |
| 2016/0046379 | A1 | 2/2016 | Saada et al. | |
| 2016/0250958 | A1 | 9/2016 | Saada et al. | |

FOREIGN PATENT DOCUMENTS

| | | |
|---|---|---|
| FR | 2 866 611 A1 | 8/2005 |
| GB | 825 037 A | 12/1959 |
| GB | 990 581 A | 4/1965 |
| WO | 2012/011347 A1 | 1/2012 |

OTHER PUBLICATIONS

International Search Report issued in Patent Application No. PCT/EP2015/064396 dated Oct. 9, 2015.
Written Opinion issued in Patent Application No. PCT/EP2015/064396 dated Oct. 9, 2015.
International Preliminary Report on Patentability issued in Patent Application No. PCT/EP2015/064396 dated Oct. 11, 2016.

* cited by examiner

ELASTIC SYSTEM FOR IMMOBILIZING A SEAT TRAY OF A VEHICLE, IN PARTICULAR OF AN AIRCRAFT

TECHNICAL FIELD

This invention is applicable to the domain of passenger transport, including public transport, particularly by road, rail or air. It applies more particularly to the domain of passenger seats, and particularly fold-down elements used on such seats behind the seat back, such as a retractable pivoting tray.

The invention thus relates to a device for elastically immobilizing a fold-down element in the stored position in contact with a vehicle seat back, and a vehicle seat for a passenger including such an elastic immobilizing device.

PRIOR ART AND PROBLEM THAT ARISES

In the domain of passenger transport, transport vehicles are usually and increasingly fitted with fold-down elements, particularly trays, that a passenger sitting on the seat behind the seat on which the tray is fitted can extend or fold down, depending on his or her needs. In particular, such trays can be used by passengers for eating, working or for entertainment. They are used as a support for any type of object that passengers use during their transport.

In the context of the design of fold-down elements used on seats for passengers, and in particular for pivoting trays, safety standards usually require that an immobilizing mechanism should be provided for trays in the stored position. "Stored position" for the purposes of the description of this patent application means a position in which the fold-down element is not being used. In this position, the tray is in contact with the back face of the passenger's seat back. This immobilizing of trays in the raised position is usually highly desirable to guarantee comfort and safety of passengers during their voyage.

Therefore mechanisms are known for immobilizing the tray in the stored position in contact with the back face of the passenger's seat back.

Figure 1B:
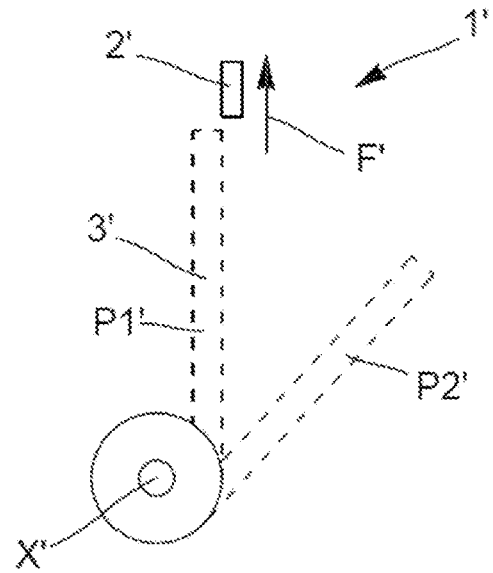

For example, FIGS. 1A and 1B show an example of an immobilizing mechanism 1' in which a moveable latch 2' is used.

On FIG. 1, a tray 3' is mounted in rotation around a rotation axis X' fixed to the seat. The tray 3' is in the raised position P1', more precisely a vertical position P1' in contact with the back face of the seat back. The tray 3' is immobilized 1' in the raised position P1' by the presence of a moveable latch 2', usually located near the top of the tray 3', that is connected to a fixed part of the seat. The position of the moveable latch 2' in contact with the external face of the tray 3' that is oriented in the direction opposite the seat, immobilizes the movement of the tray 3' towards any position other than the vertical position P1', and particularly to the horizontal usage position.

With reference to FIG. 1B, the passenger can move the removable latch 2' upwards along the direction shown by the arrow F' so as to release the tray 3'. In this case, the immobilizing mechanism 1' stops holding the tray 3' in the raised position P1' and enables movement of the tray 3' to another position P2', by rotation around the rotation axis X'.

An immobilization solution integrated into the tray rotation axis has also been developed. This is an efficient solution, but it can be difficult in practice because the mechanism is integrated into a part that needs to be made as compact as possible for ergonomic reasons.

The purpose of this invention is to overcome this disadvantage and to provide a robust and lightweight structure that respects standards in force.

Another purpose of the objects according to the invention is to reduce the weight and dimensions of parts that immobilize the pivoting tray in the high position, to guarantee safety of the passenger in the case of a crash in the case of an aircraft or a frontal crash in the case of road or railway vehicles, and to enable fast customisation of the appearance of the immobilizing system by a fast interchangeability function.

Furthermore, patent document GB 990 581 describes a tray fitted on the back of a vehicle seat. It is provided with two straps 21 that hold the tray in its vertical position, in other words folded back in contact with the seat.

PURPOSES OF THE INVENTION

A first main purpose of the invention is a device for immobilizing a pivoting seat tray behind the seat back and that will be used by a person sitting behind the seat on which the tray is located.

According to the invention, the immobilizing device is elastic while making it possible to prevent extension of the tray and with a resistance to stretching that increases beyond a determined elongation.

In the main envisaged embodiment of the invention, the device comprises at least one elastic strap fixed behind the seat back to hold the tray in contact with the seat back.

This strap may be a woven thong with a single thread composed of two different sorts of fibres with different resistances to stretching, the fibre(s) with the highest resistance to stretching surrounding the fibre(s) with the lowest resistance to stretching.

Another embodiment consists of weaving the strap with two threads with different resistances to stretching.

Another variant consists of the strap having two parts installed in parallel, a part that has low resistance to stretching and a part that has higher resistance to stretching.

Another variant consists of using a rigid element placed on a part of the strap that has low resistance to stretching and a stop placed on a fixed element other than the strap and that has higher resistance to stretching.

This element that has higher resistance to stretching is preferably composed of the seat cover.

Another variant consists of using a second rear strap placed between the tray in the stored position and the seat back and that has higher resistance to stretching to prevent tipping of the tray in contact with the seat back in case of high accidental pressure on the back face of the tray when the tray is in the stored position.

Another variant consists of the strap having two elastic parts with double resistance to stretching placed at the ends of the strap and built into the seat back, the remainder of the strap being a part external to the seat back, visible to the passenger behind the seat back on which the tray is fitted, this external part being designed to be customised.

In this case, the production of each part with double resistance to stretching can include a relaxed spring that has high resistance to stretching and the elastic strap itself located partly inside the seat back.

The elastic strap can form a support for interchangeable visual elements.

It can also be used to attach various accessories.

It may also include electrical and/or communication interfaces, the wiring of these interfaces being incorporated into the strap.

A second main purpose of the invention is a vehicle seat in which the seat back is fitted with an elastic immobilizing device mentioned above.

LIST OF FIGURES

Figure 2A:
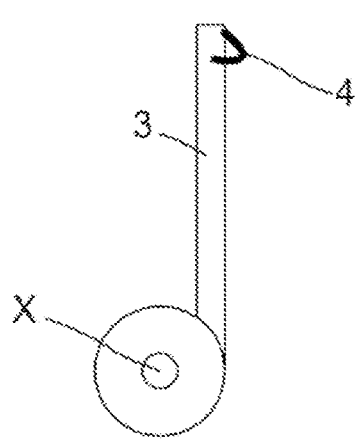
Figure 2B:
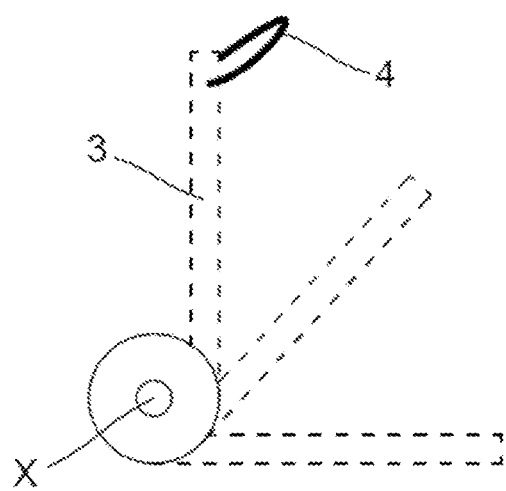
Figure 3:
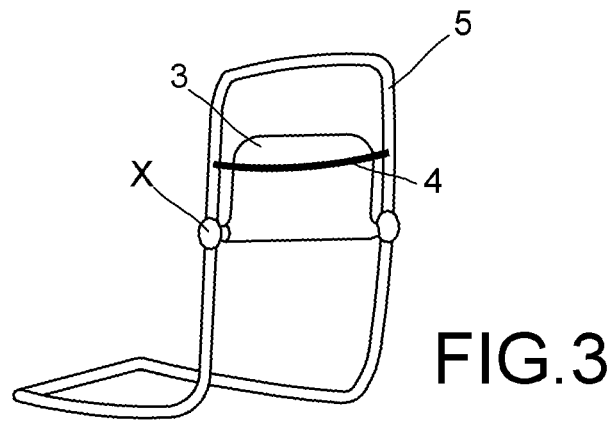
Figure 4:
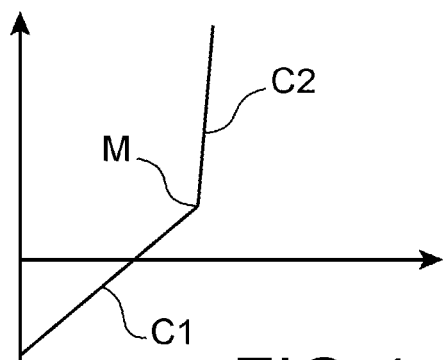
Figure 5A:
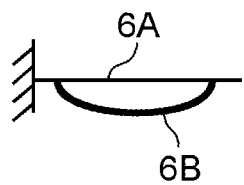
Figure 5B:
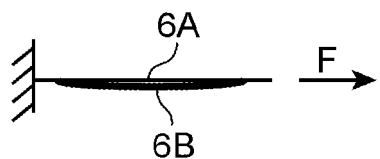
Figure 6A:
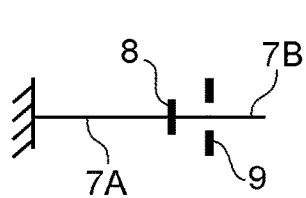
Figure 6B:
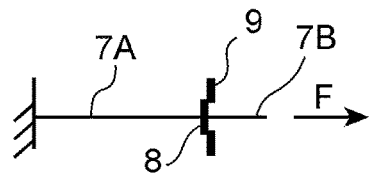
Figure 7A:
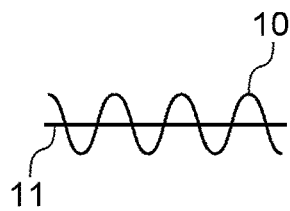
Figure 7B:
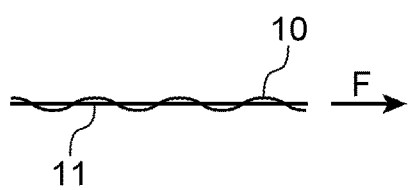
Figure 8:
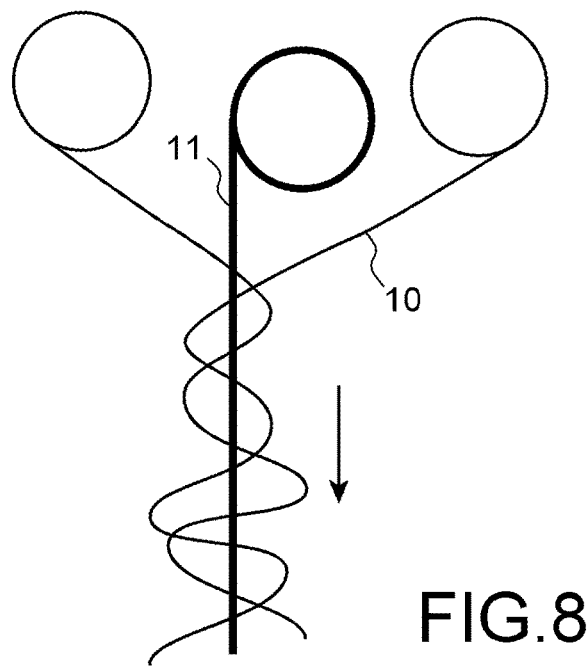
Figure 9:
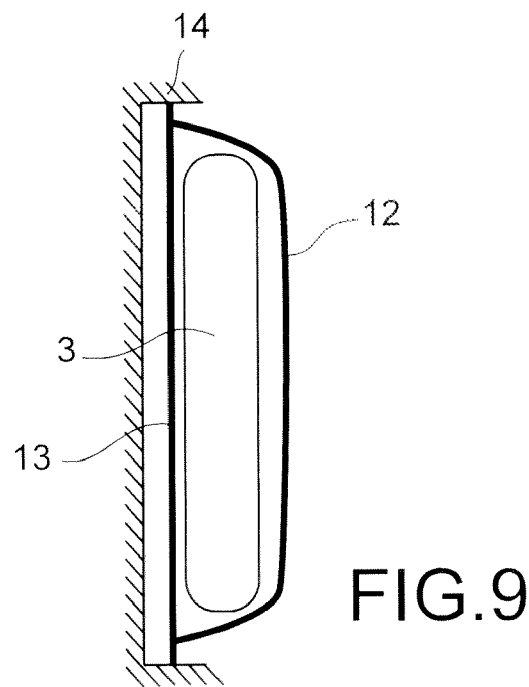
Figure 10A:
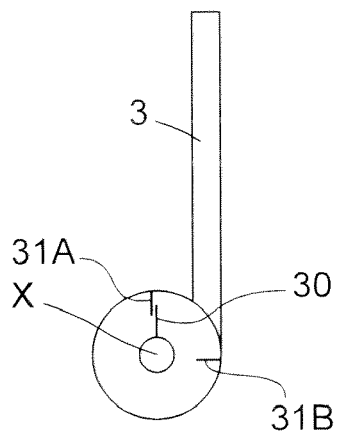
Figure 10B:
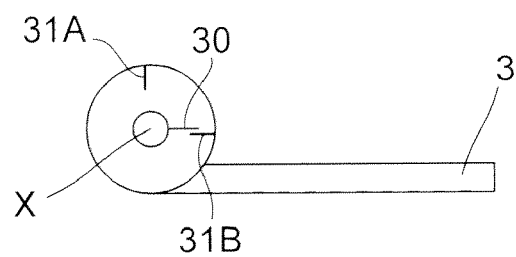
Figure 11:
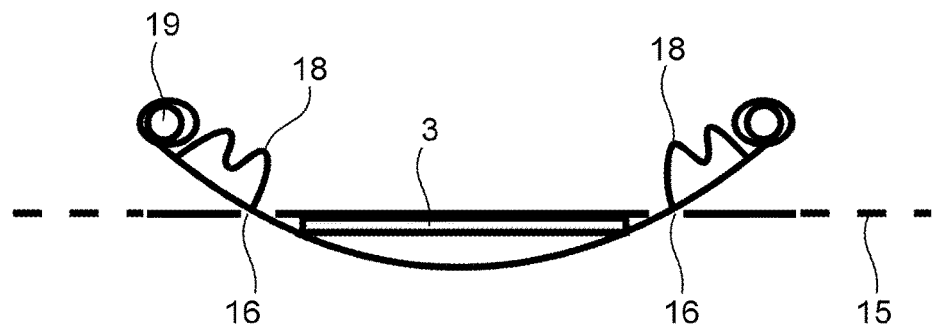
Figure 12:
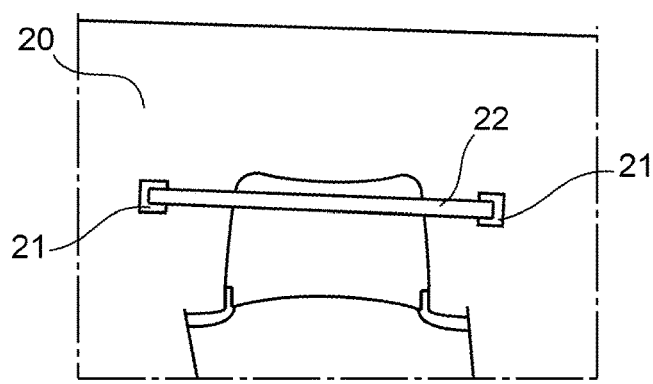
Figure 13:
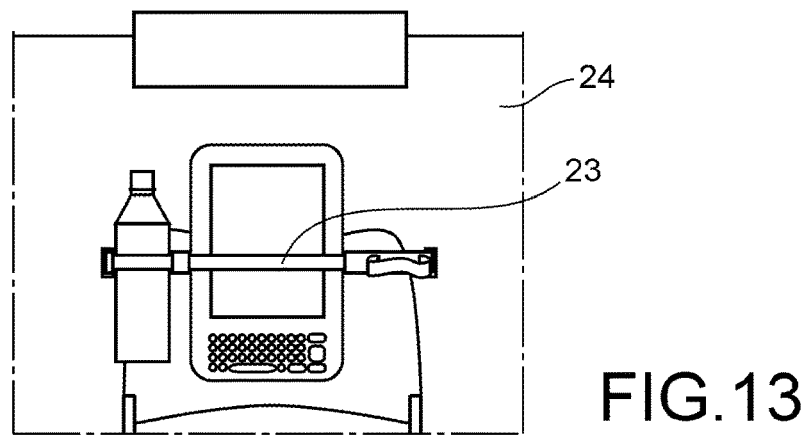

The invention and its various technical characteristics will be better understood after reading the following description accompanied by several figures representing the following, respectively:

FIGS. 1A and 1B, two diagrams showing an immobilizing device according to prior art;

FIGS. 2A and 2B, two diagrams showing the immobilizing device according to the invention;

FIG. 3, a diagram showing the layout of the device according to the invention, on a structure of a vehicle seat;

FIG. 4, a graph illustrating operation of the immobilizing device according to the invention;

FIGS. 5A, 5B, diagrams illustrating operation of a first embodiment of the strap according to the invention;

FIGS. 6A and 6B, a second embodiment of the immobilizing device with a strap according to the invention;

FIGS. 7A, 7B, two diagrams showing the composition of the fibres or threads used in weaving the strap of the device according to the invention;

FIG. 8, a diagram illustrating fabrication of such a thread or such a fibre, used in the strap of the device according to the invention;

FIG. 9, a diagram related to an additional variant of the device according to the invention;

FIGS. 10A and 10B, two diagrams showing another variant of the device according to the invention;

FIG. 11, a diagram showing the layout of a variant embodiment in a vehicle seat back;

FIG. 12, a figure showing the layout of a variant of the invention on a vehicle seat back; and FIG. 13, a figure showing another layout of the device according to the invention, installed on a vehicle seat back;

DETAILED DESCRIPTION OF SEVERAL EMBODIMENTS OF THE INVENTION

With reference to FIGS. 2A et 2B, the principle of the elastic immobilizing device consists of using a deformable textile or plastic strap, to at least partially immobilize rotation of the upper part of the pivoting tray and in at least one direction The tray 3 is mounted on an approximately horizontal rotation axis X and fixed behind the seat back, to the seat back. An elastic strap 4 retains the tray 3 when it is in the approximately vertical position. The elastic strap 4 is fixed to the seat back and acts on the distal part of the tray 3. FIG. 2B shows the tray 3 in three positions, namely a vertical position, an intermediate position and a horizontal position.

With reference to FIG. 3, the elastic strap 4 is installed on the structure 5 of the seat back on which the tray 3 is installed free to pivot about its fixed X rotation axis, relative to the structure of the seat back.

Thus, the elastic strap 4 holds the tray 3 in the stored position, by applying a force on it opposed to the backwards direction of extension of the tray relative to the seat back. It must be easy for the user to lift the elastic strap 4 so as to release the tray 3 so that it can be extended to a horizontal usage position for a passenger sitting on the seat immediately behind the seat that supports the tray being considered. However, the elastic strap must be strong enough to resist abusive tension in extension.

To achieve this, the elastic strap 4 has a resistance to stretching with two plateaux, or two values, namely that has low resistance to stretching for limited elongations so that it is easily deformed during normal use of the tray, and that has higher resistance to stretching to be able to resist abusive use of the elastic strap 4.

With reference to FIG. 4 that is a graph illustrating the two different resistances to stretching of an elastic strap used in the device according to the invention, the force applied by the user onto the strap is symbolised by the vertical arrow of the ordinate, while the strap position is shown on the abscissa. Therefore this arrangement is designed so that a higher resistance to stretching under abusive forces can be combined with easy use of the strap under normal conditions.

The curve composed of two parts C1 and C2 of this graph shows that elongation of the elastic strap is easy, in the first part C1 when the force applied to this strap is low. As shown in the second part C2, the resistance to stretching of the elastic strap increases at a given moment M, and elongation of the strap increases much more slowly, while the force applied to it continues to increase proportionally.

The variation in the resistance to stretching can be achieved in several ways.

Firstly, two spring elements may be mounted in parallel, one that has low resistance to stretching that can be used at small extensions, and a second spring that has higher resistance to stretching for larger or even accidental extensions. Therefore it is proposed to use a textile component in which fibres with different elasticities can be combined, to reproduce the combination of the springs within the textile.

FIGS. 5A and 5B show the example of a combination between a part 6A that has low resistance to stretching and a part 6B that has higher resistance to stretching. Since the part 6B that has higher resistance to stretching is fitted so that it is much looser and is slack when the part 6A that has low resistance to stretching is relaxed, said part 6B that has higher resistance to stretching is not stressed at the beginning of the movement under the action of a force F, namely for small extensions. With reference to FIG. 5B, when the part 6A that has low resistance to stretching is extended, the part 6B that has higher resistance to stretching is tensioned and comes into action at longer elongations. It becomes much more difficult for the user to continue extending the elastic strap.

FIGS. 6A and 6B show a second variant for making an elastic system with two different resistances to stretching. In this case the strap is composed of a part 7A that has low resistance to stretching and a part 7B that has high resistance to stretching. These two parts are installed in series. There is a rigid element 8 between the two parts fixed to the elastic strap, at the junction between these two parts, the part 7A with low resistance to stretching and the part 7B with high resistance to stretching. A fixed stop mounted on the seat back is placed around or at the side of the elastic strap to be able to stop the rigid element 8 when the flexible part 7A of the strap is extended under the action of a force F. As shown in FIG. 6B, extension of the part that has low resistance to stretching 7A is no longer possible when the rigid element 8 is in contact with the fixed stop 9. The part 7B that has high resistance to stretching can then come into action so that the resistance to stretching perceived by the user is higher.

With reference to FIGS. 7A et 7B, another interesting variant would be to combine fibres with different resistances to stretching within the same thread. This, a fibre with a relatively high resistance to stretching 10 loosely surrounds an element with lower resistance to extension 11 that is stretched. The fibre with lower resistance to stretching 11 forms a core around which the fibre that has higher resistance to stretching 10 is twisted. FIG. 7A shows the assembly completely relaxed, in other words the strap is in its most frequently used form, in other words it is in the form in which it holds the tray in contact with the seat back because the strap is no longer tensioned. On the other hand, as shown in FIG. 7B, when a force F is applied on the combination of the assembly of two fibres (one that has higher resistance to stretching 10 and one has lower resistance to stretching 11), the latter that is stretched more than the fibre that has higher resistance to stretching 10 is elongated, while the spiral of the fibre that has higher resistance to stretching 10 comes firmly into contact with the fibre that has lower resistance to stretching 11. The fibre that has higher resistance to stretching 10 then comes into action, such that the resistance to stretching perceived by the user is higher.

Within the framework of this concept represented by FIGS. 7A and 7B, it is also possible to combine threads with different resistances to stretching within the same textile. This means weaving a strap with two threads with different resistances to stretching. In the relaxed state, the threads that have low resistance to stretching are relatively taut and can extend until the threads that have high resistance to stretching are taut and begin to apply higher resistance to stretching. Thus at low extension, the resistance to stretching is provided by the threads or fibres with low resistance, while at higher extensions, the resistance to stretching is provided by the threads or fibres with higher resistance.

With reference to FIG. 8, the thread composed of two different fibres can be made using a braiding process. This consists of coating one or several threads with low resistance to stretching 11, for example based on thermoplastic polyurethane, with one or several threads with higher resistance to stretching 10, in other words very strong, for example based on polyester. The two chosen material can be fire resistant and respect regulatory constraints applicable for installation in an aircraft cabin. For example, the TreviraCS® product could be used for polyester and Ellastolan® could be used for thermoplastic polyurethane.

With reference to FIG. 9, the elastic strap 12 holding the tray 3 in contact with the fixed seat back can be combined with a rear strap 13 located between the tray 3 and the seat 14 when the tray 3 is in the stored position, in other words when it is vertical. The function of this rear strap 13 is to prevent the tray 3 from penetrating into the seat back 14 if an excessive force were applied in the stored position of the tray in the direction opposite to the direction of extension of the tray 3. This is the case particularly in the case of an accident, crash, or frontal shock of the vehicle.

With reference to FIGS. 10A and 10B, note that a second solution that prevents the tray from penetrating into the seat back 14 is to shift this system to prevent rotation of the tray 3 at the rotation axis X of the tray 3. By using an element 30 free in rotation and fixed to the tray 3 at the X axis and two fixed angular stops 31A and 31B, the rotation angle of the tray 3 about its X axis can be limited without need to use an additional strap.

A particularly interesting variant embodiment is shown in FIG. 11 integrated into the seat back. This FIG. 11 is a partial sectional diagram of the seat back.

It shows an elastic strap 17 holding a tray 3 in contact with a seat back represented, among other ways, by its cover 15, namely the back part of the cover of the seat back. The elastic strap is fixed to a rigid structure 19 made of composite seat tubes positioned inside the seat back at this location. Thus, in the relaxed state, the elements 18 that have high resistance to stretching that are placed in parallel with the elastic strap 17 are relaxed. The elastic strap 17 is inside the seat back and the cover 15, and comes out of it through openings 16 in the cover 15. Thus, when the user pulls on the elastic strap 17 to release the tray, the strap tightens, as do the elements 18 that have high resistance to stretching so that they become functional and provide much more resistance to the user for elongation of the elastic strap 17.

A specific implementation of the variant shown in FIGS. 6A and 6B is shown in FIG. 12, that consists of using the cover 20 of the seat back to attach the fixed stop mark 9 on FIGS. 6A et 6B to it. Thus the rigid element, not visible on this FIG. 11 because it is behind the cover 20, stops in contact with a rigid part of the cover located at the openings 21, for example a metal piece. Thus, when the strap 22 is elongated, it slides in the openings 21 in the cover 20 and is stopped at the openings 21 by means of metal parts.

Finally with reference to FIG. 13, the visible part 23 of the strap that projects behind the seat back 24 can be fitted with attachment or support elements, for example to support a video game, a book or simply a bottle of water. Thus, the visible part 23 of this strap can be customised as a function of the customer's needs and specification.

This visible part of the strap can be complemented by adding an electric cable to it, and adding a textile protection to the strap. This makes it possible to use an interface making use of electronic elements or equipment such as a tablet computer. The function of the strap is then to act as a host station for a touch tablet, with a network connection and charging outlet, and using interfaces adjacent to the tablet computer. Wiring of these interfaces is then built into the strap. Thus, different peripherals of the passenger sitting in the seat behind the tray concerned can be electrically powered by the vehicle's circuits and can receive telecommunication information.

The device according to the invention is primarily applicable to aircraft and particularly to passenger seats.

What is claimed is:

1. A seat back assembly comprising:
    a seat back;
    a tray that is free to pivot on a back face of the seat back, the tray being designed for use by a person sitting on a seat behind the seat back on which said tray is fitted; and
    an immobilization device for retaining the tray in a stored position, the immobilizing device being elastic,
    wherein the immobilization device has a resistance to stretching that increases beyond a certain determined elongation of the device.

2. A Vehicle seat comprising the seat back assembly according to claim 1.

3. The seat back assembly according to claim 1, wherein the resistance of the immobilization device corresponds to a ratio of resistive force over elongation of the immobilization device.

4. The seat back assembly according to claim 1, wherein the immobilization device comprises an elastic strap fixed behind the seat back to hold the tray in contact with the seat back.

5. The seat back assembly according to claim 4, wherein the elastic strap is woven from a single thread itself composed of two different types of fibres with different resistances to stretching, the fibre that has a higher resistance to stretching surrounding the fibre that has a lower resistance to stretching.

6. The seat back assembly according to claim 4, wherein said elastic strap is woven from two threads with different resistances to stretching, the thread that has a higher resistance to stretching surrounding the thread that has a lower resistance to stretching.

7. The seat back assembly according to claim 4, wherein said elastic strap is composed of two parts installed in parallel, a part that has a low resistance to stretching and a part that has a high resistance to stretching, the part that has a high resistance to stretching being much more relaxed than the part that has a low resistance to stretching, when the elastic strap is in a relaxed position.

8. The seat back assembly according to claim 4, wherein the immobilization device further comprises a rear strap for placement between the tray and the seat back, in a folded position of the tray, and with a high resistance to stretching, in order to prevent the tray from tilting in contact with the seat back when the tray is in the stored position.

9. The seat back assembly according to claim 4, wherein the elastic strap comprises supports for interchangeable visual elements.

10. The seat back assembly according to claim 4, wherein the elastic strap comprises accessory attachment elements.

11. The seat back assembly according to claim 4, wherein the elastic strap comprises electrical and/or communication interfaces, a wiring of said electrical and/or communication interfaces being integrated into the elastic strap.

12. A Vehicle seat comprising the seat back assembly according to claim 4.

13. The seat back assembly according to claim 4, wherein a rigid element is placed on a part of the elastic strap that has a low resistance to stretching and a stop is placed on a fixed element other than said elastic strap and that has a higher resistance to stretching.

14. The seat back assembly according to claim 13, wherein said fixed element, having a high resistance to stretching, is composed of a cover of the seat back.

15. The seat back assembly according to claim 4, wherein the elastic strap has two elastic end parts built into the seat back and each having two different resistances to stretching, and a visible part on the outside of the seat back that can be used by the person sitting behind the seat to which the tray and the elastic strap are fixed.

16. The seat back assembly according to claim 15, wherein the two end parts, each having two different resistances to stretching, are composed of a spring that has a high resistance to stretching, relaxed in a relaxed position of the elastic strap, and by the elastic strap itself located partly inside the seat back.

\* \* \* \* \*